Dec. 23, 1952          H. SLOWAK          2,622,627
APPARATUS FOR THE MANUFACTURE OF TUBULAR FABRICS
Filed July 12, 1949          5 Sheets—Sheet 1
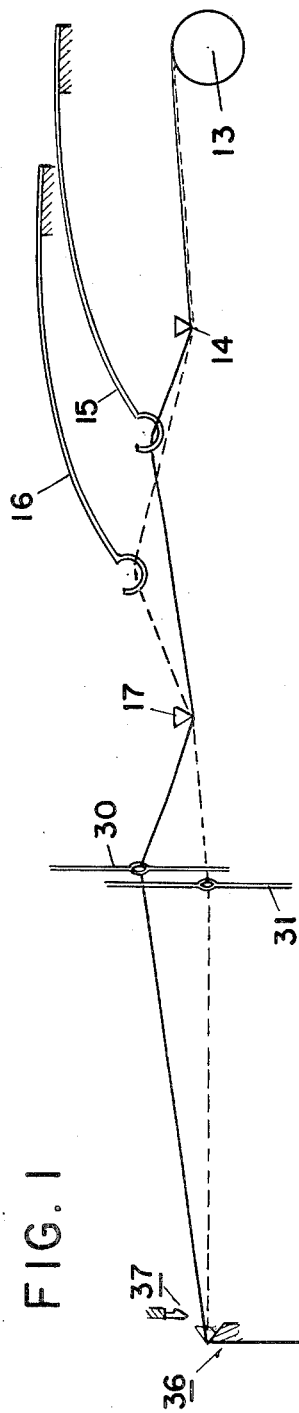
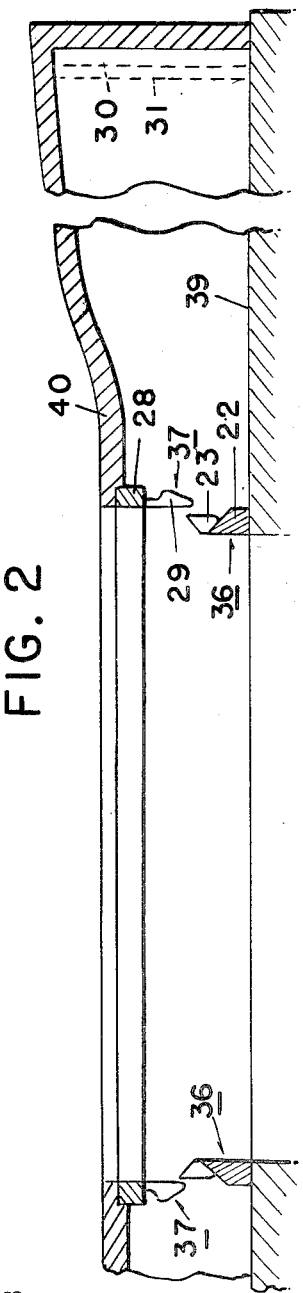
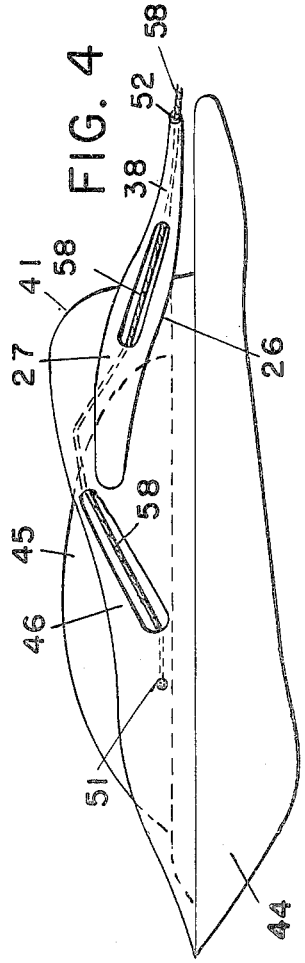
INVENTOR
HERMANN SLOWAK,
BY E. F. Wenderoth
ATTORNEY

INVENTOR
HERMANN SLOWAK,

Dec. 23, 1952      H. SLOWAK      2,622,627
APPARATUS FOR THE MANUFACTURE OF TUBULAR FABRICS
Filed July 12, 1949      5 Sheets-Sheet 3

INVENTOR
HERMANN SLOWAK,
BY *E. F. Wenderoth*
ATTORNEY

Dec. 23, 1952 H. SLOWAK 2,622,627
APPARATUS FOR THE MANUFACTURE OF TUBULAR FABRICS
Filed July 12, 1949 5 Sheets-Sheet 4

INVENTOR
HERMANN SLOWAK,
BY E. F. Wenderoth
ATTORNEY

Patented Dec. 23, 1952

2,622,627

UNITED STATES PATENT OFFICE 2,622,627

APPARATUS FOR THE MANUFACTURE OF TUBULAR FABRICS

Hermann Slowak, Montevideo, Uruguay

Application July 12, 1949, Serial No. 104,172
In Switzerland July 21, 1948

3 Claims. (Cl. 139—13)

The present invention relates to a process for the weaving of tubular fabrics, and also to the apparatus for performing the operations which characterize the said process.

A principal object of the invention is the embodiment of a new and improved process for the manufacture of tubular fabrics on a circular loom which, except for the special attachments and modifications according to the present invention, may be essentially conventional in construction. A further and related object is the development of the aforesaid special attachments or tools and modifications.

Briefly stated, the modifications consist essentially in the provision of a two-piece annular reed consisting of two individual reeds correlated to function as a unit, and the special tools, one of which is provided for each shuttle, take the form of a so-called "lance" mounted on, i. e. integrated with, its associated shuttle.

The foregoing and other objects of the invention, which will be manifest from the following detailed description, with reference to the accompanying drawings, of a presently preferred embodiment thereof, are realized by the thus-disclosed relationship of parts.

On the accompanying sheets of drawing,

Fig. 1 is a schematic showing of the relationship between the essential parts of a circular loom.

Fig. 2 is a radial partial section through the disk of a circular loom and through the two-piece reed according to the invention, the section being taken along the line II—II of Fig. 3.

Fig. 4 is a side view of the lance as seen from the mid-point of the disk.

Figure 3:
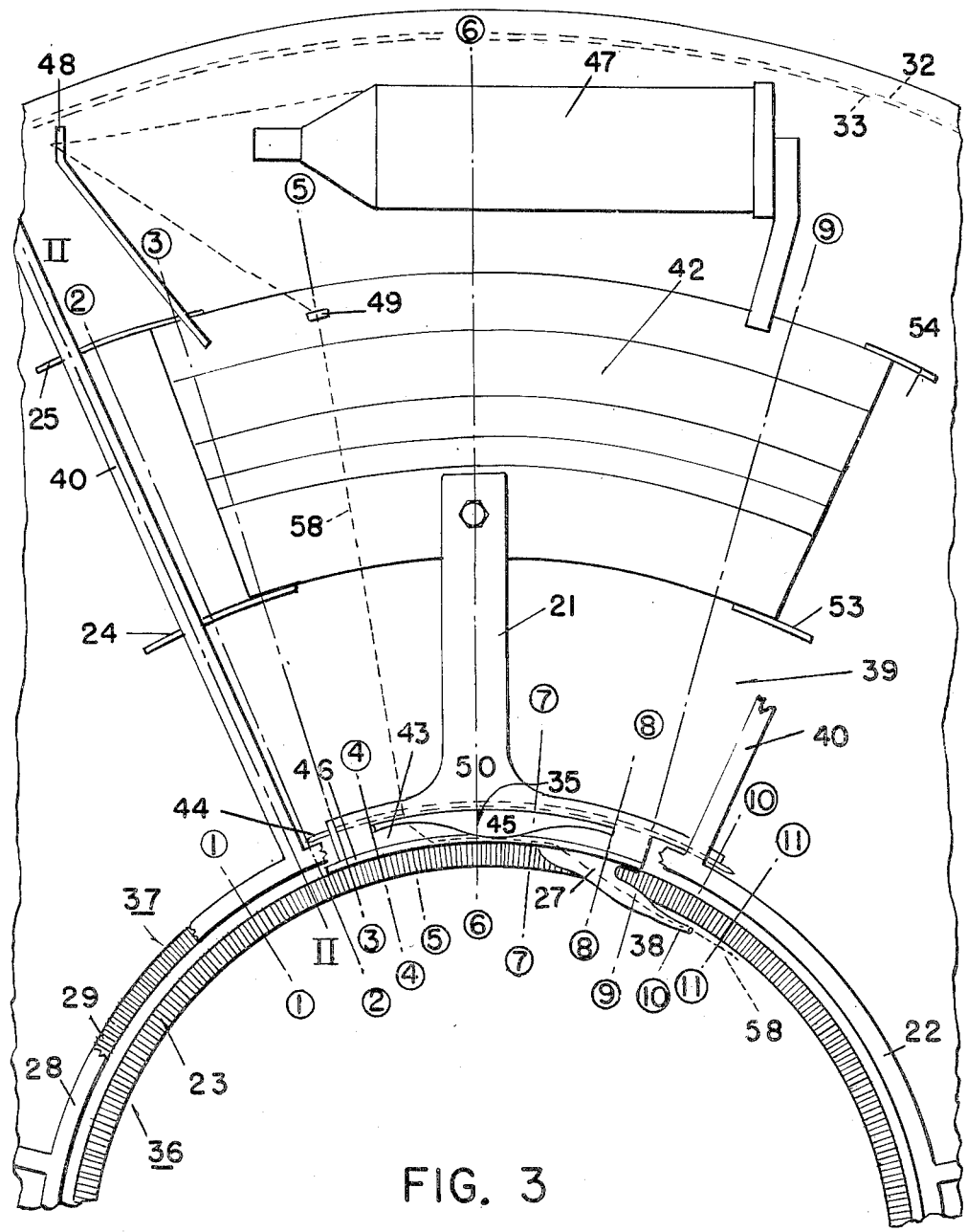
Fig. 3 is a partial top plan view of the annular disk, the two-piece reed and a shuttle with associated lance.

Before proceeding with a detailed description of the aforesaid embodiment of the invention, the following preliminary explanations may be made:

For carrying out the weaving process according to the present invention, it is necessary to have a circular loom in which one or more shuttles are advanced in a circular path without play and with uniform speed, and which is provided with a mechanism which so actuates the heddles that in front of each moving shuttle a number of threads are drawn from the warp thread web in one direction, and the rest of them in the opposite direction, thus forming the shed which is closed again back of the shuttle.

In the herein-described exemplary embodiment, the circular loom employed is of disk-shape construction. The elements necessary for guiding and driving the shuttles are mounted on a disk 39 which is cut out concentrically, thus acquiring the shape of a broad ring or annulus. The weaving takes place at the inner rim of this annular disk 39. The warp threads extend radially outward from this rim and lie radially spread out and mostly in a more or less level plane. The finished fabric has the shape of a hose. The woven thread lengths from the hose are disposed at right angles to the unwoven thread sections.

The weaving process consists in providing each of the shuttles, which may be two or more in number, with a special tool which is guided in a circular path along a stationary reed consisting of a main reed and an auxiliary reed, and which owing to its continuous circular motion lifts out over the rim of the main reed the groups of warp threads each time lying in the shed near the tip of the dents of the main reed and applies the weft thread coming from the shuttle to the side of this reed facing the fabric so that it may be bound to the already formed fabric, the warp threads lifted over the rim of the main reed being held by the auxiliary reed located opposite it and then returned to the main reed in the same lay and sequence as before.

Fig. 1 shows the over-all arrangement of the elements or members of a circular loom for weaving according to the herein described process. The individual elements, with exception of the reed, are of the same kind as those employed in linear or flat looms. In circular looms these elements are arranged circularly and, instead of a single warp beam, it is necessary to employ several having the shape of spools on which the warp threads are wound. It is also necessary to have several pairs of rollers for removing the finished goods. The spools and rollers are so arranged relatively to each other that their axes form a regular polygon.

The schematic arrangement of Fig. 1 shows in effect a section through such a circular loom, taken perpendicularly to the spools and rollers. The warp threads extend from the spools 13 over the guide bar 14 through the hooks of springs 15 and 16, of which there are as many as there are warp threads, and then over the second guide bar 17 and through the eyelets of heddles 30 and 31, thus forming the shed in which the shuttle moves perpendicularly to the plane of the section. Then, without touching auxiliary reed 37, the threads extend to reed 36 at the edge of which weaving thereof takes place. The fabric then passes to the cloth beam 19 through a roller-pair system, one pair of which is shown at 18.

The two-piece reed

This tool is made up of two reeds, the main reed, which may also be designated a binding reed, and the auxiliary reed, which may be called a guiding reed. Each reed is provided with a supporting rim to support reed dents. The two reeds are shown in radial section in Fig. 2, and in plan in Fig. 3. The main reed 36 consists of a ring-shaped reed member 22 provided with radial or approximately radial extending slits in which the reed dents 23 are held fast at one end while their other end is free. The auxiliary reed 37 is similarly made up of a reed member 28 and reed dents 29. Figs. 2 and 3 show an embodiment of the reeds in which the dents are perpendicular to the ring, but it is not absolutely necessary for them to exactly occupy this position. Reed 36 is secured on disk 39 in any suitable and conventional way. Its inner diameter is as great as that of the central cut-out portion of the disk, so that the inner edges of the reed and the disk coincide. The inner diameter of reed 37 is somewhat larger than the outer diameter of reed 36 as measured at the edges of the reed dents. Reed 37 hangs on the supporting frame 40 of spoke wheel design, which, by its outwardly bent spoke ends bears against the outer edge of disk 39 and is suitably secured there. Line II—II in Fig. 3 represents the median radially extending line of frame 40 from which spacings for the proper relative thread positions may be measured and a radial partial section along line II—II is illustrated in Fig. 2. The number of dents depends on the fineness of the fabric, and is the same for both reeds. Reed 36 and reed 37 are so positioned relatively that the tips of the dents of reed 36 lie opposite the rounded-off ends of the dents of reed 37, while overlapping by about the width of the dents in the direction of the axis of the loom, and in the direction of the radii maintaining a spacing that permits introduction of the hereinafter described weft thread inserter. The dents of reed 37 are offset relatively to those of reed 36 by the thickness of one to two flange members (hereinafter described) in the direction of motion of the shuttle (counter-clockwise). By means of this arrangement and the special thread guide, the threads will always remain in their proper relative position even if they slip from one reed to the other. The binding reed 36 and the guiding reed 37, so complement each other that they form one unit like a one-piece reed, and this unit is therefore called a two-piece reed.

The lance

Figure 5:
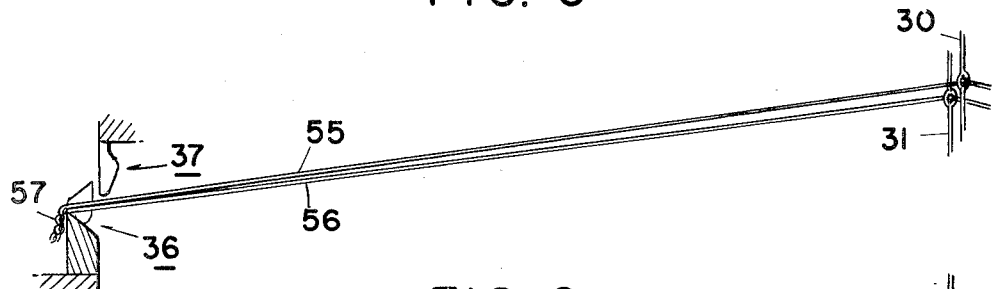
Figs. 5 to 15 show, in diagrammatic partial sectional views, as hereinafter explained in columns 5 and 6 herein, the lay of the threads, from which the fabric is formed, relatively to the weaving tools during the individual stages of one working operation.
Figure 6:
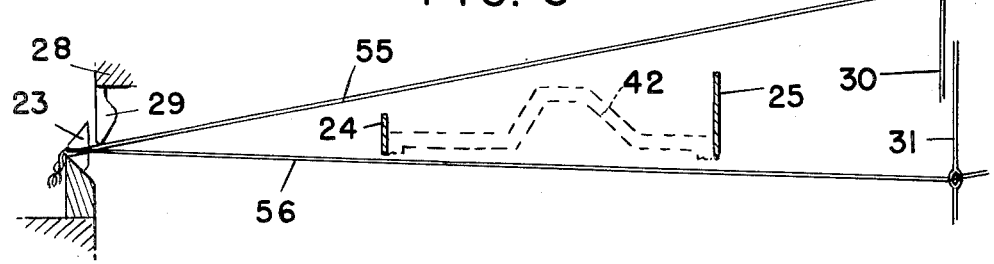
Figure 7:
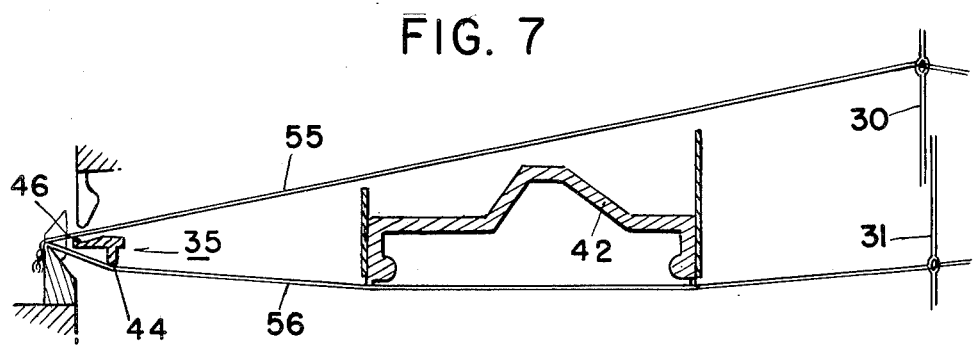

The second tool necessary for weaving by the hereindescribed process is the so-called lance which is advanced circularly along the reed by means of the shuttle. The main features of an embodiment of such a shuttle are shown in Fig. 3 (plan view) and Figs. 6 to 13 (radial sections). The weft thread spool 47, which bears against the periphery of the disk, is carried by the runner or slide 42, which is provided with devices for its guidance and advance, and is given such a shape by extensions attached front and back (24 and 25, and 53 and 54 respectively) that it can be inserted without hindrance between the layers of warp threads. On slide 42 is integrally mounted the arm 21 which stands out from the reed and holds the lance 35. The shuttle, consisting of the slide 42, the extension members 24, 25 and 53, 54, the spool 47 and the lance 35 and arm 21, always lies within the shed as can be seen in Figs. 6 to 13 which show its individual parts in section, while the shed bounded by two warp thread layers and the inner row of heddles has the form of a triangle. This triangle is represented in Fig. 6 by the threads 55 and 56 and by the heddles 30 and 31. The finished fabric is indicated by 57 in Fig. 5. The heddles are arranged in two cross rows, their position being indicated by the lines 32 and 33 in Fig. 3. The direction of motion of the shuttle is counter-clockwise.

Conventional means is provided for actuating the shuttle and the heddles, such means per se constituting no part of the present invention proper.

Figure 8:
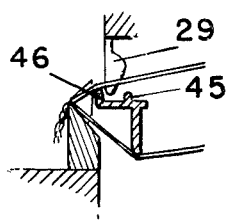
Figure 9:
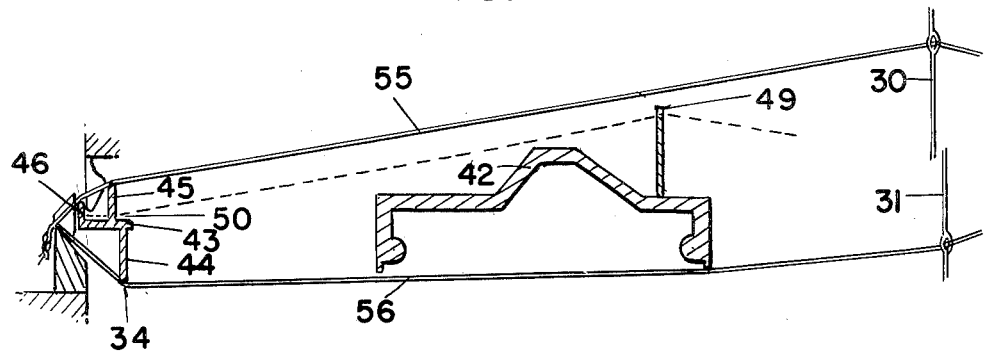
Figure 12:
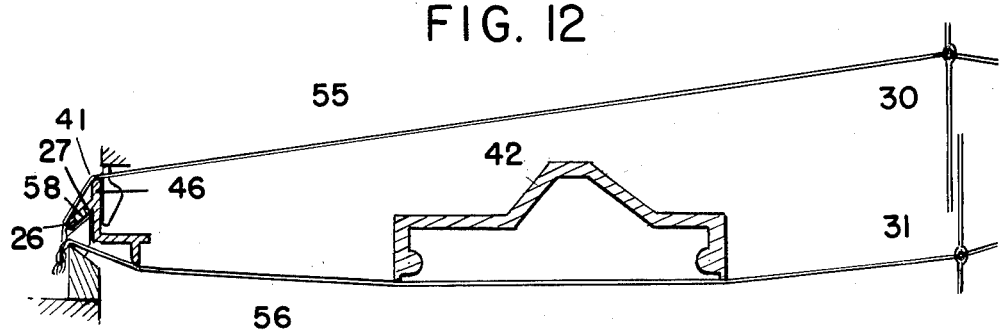
Figure 13:
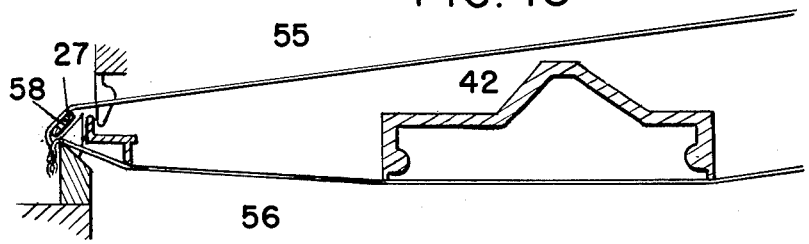
Figure 15:
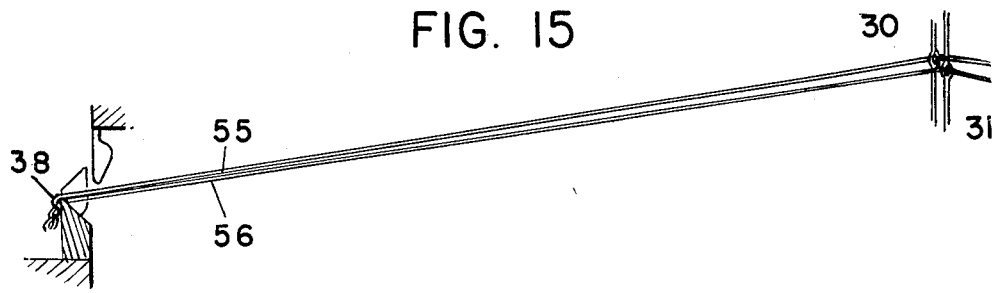
Figure 14:
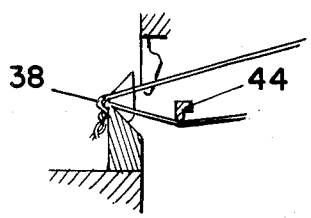

The lance 35 is made up of three cylindrically rounded, i. e. arcuate, sheet or flange members which terminate in points, see Fig. 4, and of an angle member. The former are attached to the supporting segment 43 (Fig. 9) formed by a widening of arm 21 (Fig. 3). Fig. 4 shows a side view of lance 35 (as seen from the center of the disk), Fig. 3 shows it in plan view and Figs. 6 to 14 show several radial sections. The downward extending flange 44 has its foremost one-third part widened, the furthest downward extending point being indicated by 34. The outer lifting flange 45 and the inner lifting flange 46 are mounted at the top of support 43. Flange 45 is bent inwardly at the top (Figs. 4 and 9), thus being adapted to the shape of reed 37 which it half surrounds on the outside. Flange 46 is arranged for positioning between the two reeds (Figs. 8, 9 and 12). Its foremost half is narrow, but it then widens into a bulge that terminates in an abruptly-sloping end member indicated by 41 (Fig. 4). The angle member, of which feeder 27 constitutes the main part, is attached to flange 46 or may be attached to the supporting member 43. Feeder 27, a narrow rearwardly tapering flange, is positioned obliquely rearward and inward at an angle of about 16 degrees. It engages over the flanged ends of reed 36, and its end which narrows to form the tube 38 extends beyond the inner edge of this reed. Feeder 27 is bored longitudinally, or else is provided with a groove which may widen to form a recess. Figs. 3 and 4 show diagrammatically how the weft thread 58 is to be threaded in. Upon leaving spool 47 it passes through the eyelets 48 and 49 and at 50 through the flange 45, and then under reed 37 to 51 where it enters flange 46. In this flange, accordingly between the two reeds, it rises guided by grooves and freely stretched over recesses to the feeder 27. In an obliquely downward direction it then passes through further grooves and the tube 38, and leaves the feeder at 52.

The weaving

In contrast to conventional looms in which the individual operations that enter into the weaving are performed successively, circular looms operate continuously. In ordinary flat looms the shed is formed by first pulling some of the warp threads upward and the rest of them downward, the weft being then inserted and the weft thread being finally pressed on the fabric over the entire width of the thread web after the shuttle has come to rest outside of the shed, but in a circular loom if equipped with one shuttle (which however never occurs in practice because unsuitable, but which is here assumed for the sake of simplification), these operations will be performed at the same time at different points of the radially extended warp thread layer. Thus, only a limited number of heddles are actuated for formation of the shed in one sector. The weft is laid on the stationary reed in another sector by the advancing motion of the shuttle, and in the adjoining sector the warp threads are stretched for the weft thread to apply to the edge of the fabric. The mechanism that moves the warp threads in the transverse direction and the driving device that permits rotation of the shuttle are so coupled together that the shuttle is always within the shed. This mechanism and this driving device are per se old and not described in the present application.

Following is a detailed description of the individual movements as they take place successively:

Figs. 5 to 15 give an analysis of and illustrate in eleven consecutive stages the changes in the lay of a pair of threads taken from the warp during the passage of the shuttle. The positions of the lance passing the pair of threads at the selected timepoints are indicated by the digits 3 to 10 in Fig. 3. The respective positions of the lance, the shuttle and the spool of thread are indicated by the corresponding digits 1 to 11 in Fig. 3. It is however to be noted that at the point fixed in Fig. 10, for example, the shuttle has advanced so far that the position 6—6 has reached the pair of threads (at 1—1).

The thus-explained changes in the lay of a pair of threads illustrate the movement of the entire warp, since no thread makes a movement that differs from the ones described. One of these taken-out threads is indicated by 55 in Fig. 15 and is hereinafter called yarn, and the other thread indicated by 56 is the twist. It is intended to make a linen binding and each two threads lie in one reed space.

*1st stage (Fig. 5).*—Lay of the threads at 1—1 in Fig. 3. The heddles have closed the previously existing shed and are about to form a new one. The warp threads 55 and 56 extend parallel from reed 36 through the eyelets of heddles 30 and 31 to the warp spool (not shown). The yarn 55 bears on the edge of reed 36 with the weft thread transverse thereto and the twist 56 on top of the same.

*2nd stage (Fig. 6).*—Lay of the threads at 2—2 in Fig. 3. Heddle 30 moving upward and heddle 31 moving downward have opened the shed. The warp threads are now crossed, since the twist 56 previously on top has been pulled down. The tips of the shuttle, i. e. the extension members 24 and 25, penetrate the shed.

*3rd stage (Fig. 7).*—The lay of the threads relatively to the shuttle is indicated by 3—3 in Fig. 3. The shed is completely formed. Within it can be seen the slide 42 and the foremost part of lance 35, as well as the tip of flange 44. The tip of flange 46 has also reached the pair of threads. The flange 44 and the edges of slide 42 press the twist downward, while the yarn extends freely.

*4th stage (Fig. 8).*—Lay of the threads at 4—4 in Fig. 3. The yarn now lies on flange 46. By the forward motion of the latter it is lifted over the ends of the reed dents 29 and now lies in the space between two dents of reed 36 as well as in that of reed 37. The tip of flange 45 has reached the pair of warp threads.

*5th stage (Fig. 9).*—Lay of the threads at 5—5 in Fig. 3. The bulged part 34 of flange 44 presses the twist forcibly downward. The yarn is lifted again by the two flanges 45 and 46. The thus strongly tensioned threads pull the fabric against the reed, thus causing the weft thread inserted in the preceding operation to apply against the edge of the fabric. The angle at which the warp threads intersect is many times larger than in the case of looms with pendulating reeds. This results in the weft thread being bound in an extremely perfect manner with the already existing fabric. The weft thread 53 to be freshly inserted in this stage of operation is indicated by an oblique dash line (Fig. 4) and a dotted line (Figs. 3 and 9). It extends from spool 47 through eyelets 48, 49, 50 and 51 to flange 46.

Figure 10:
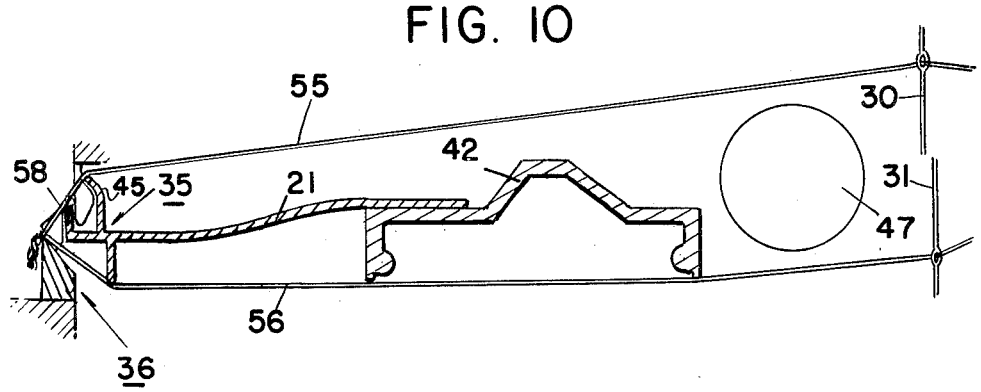
Figure 11:
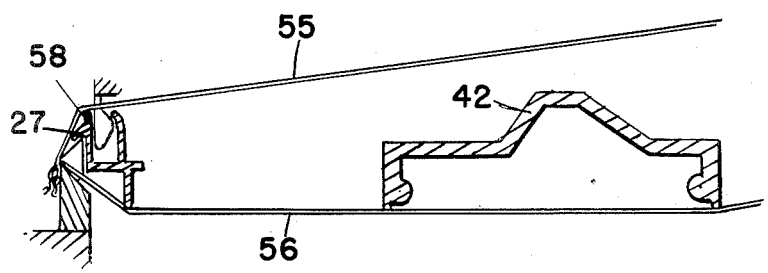

*6th stage (Fig. 10).*—Lay of the threads at 6—6. Whereas the twist continues to lie below the lance, the forward motion of the lance causes the yarn to rise upward by sliding on flange 45 until it has reached the position above the tips of reed 36 as shown in Fig. 10. The weft thread 53 is drawn upward between the two reeds and can be seen in section in a recess of flange 46.

*7th stage (Fig. 11).*—Lay of the threads at 7—7. The yarn again lies on flange 46. Flange 45 is no longer employed. The feeder 27, of which only the extension member can here be seen, pushes into the space between the edge of reed 36 and the yarn. The weft thread 53 lies above the tips of the dents of reed 36.

*8th stage (Fig. 12).*—Lay of the threads at 8—8. The main work is here done by the feeder 27. With its edge 26 it forces the yarn inward and brings the weft thread 53 nearer to the border of the fabric. The widened point of flange 46, indicated by 41, causes the yarn to rise further and tensions it tightly.

*9th stage (Fig. 13).*—Lay of the threads at 9—9. Upon further movement of the shuttle, the tension of the yarn causes it to be sped back over the abruptly sloping terminal member of flange 46 (41 in Fig. 4) within the space bounded by two dents of reed 37, and dropped into its proper space in reed 36. It now lies on the narrowed center part of feeder 27.

*10th stage (Fig. 14).*—Lay of the threads at 10—10. The slider with the yarn spool and its rear extensions has passed through the shed. The rear end of the lance is still between the warp threads which have been brought back to their initial position. Of the feeder extending to form the tube 38 it is now possible to see the portion that is opposite the inner edge of the dents of reed 36. The weft thread now already lies beyond the reed and almost in the angle of the shed. By rotation of the rollers 18 shown in Fig. 1, the warp has previously advanced sufficiently to make room for the weft thread.

*11th stage (Fig. 15).*—Lay of the threads at 11—11. The twist 56 has slipped from the end of flange 44 and stretches from the reed to the heddle. The shed is closed. The weft thread, which has been guided by the feeder to the point indicated by 52, is now free and applies against the inner side of reed 36 where it is prevented from slipping by the yarn 55 lying on top of it.

This concludes one series of operations for the shuttle here under consideration. For the next series, a second shuttle comes into action and travels over the same circular path. The number of simultaneously working shuttles amounts to at least two, but it is suitable to employ more. If at the beginning mention has been made of the loom with only one shuttle, this has been done to make the explanation of the mode of operation as simple and clear as possible.

At the start of the new run, the lay of the threads as compared with what it was at the beginning of the run just described is as if their positions had been reversed. The twist now lies on the edge of the reed, and the yarn on top of the weft thread. This run and every other one is a repetition of the preceding one, the only difference being that the movements formerly made by the yarn are now made by the twist, and vice versa. In this way there are as many successive runs as there are shuttles employed, these runs being in pairs in the case of linen binding. As soon as the first shuttle has completed its path of travel and returned to the taken-out pair of threads, all the various steps are repeated exactly as described. The same applies to each of the shuttles that circulate simultaneously in continuous sequence and insert their weft threads. For a complete circular coverage there are as many runs as there are shuttles employed.

In the described and illustrated embodiment of the reed, the reed dents are level and stand perpendicular to the ring in which they are inserted, and in the direction of the radius. However, the invention also comprises types of reeds that differ from those described in that the dents employed in one or both of the reeds are curved, or else are thickened at individual points or have bulges or arches, as well as those that do not stand exactly perpendicular to the ring but form with it an angle of less than 90 degrees, or else are not positioned in an exactly radial direction but in a slightly different one.

This invention also comprises those variants of a reed made up of two individual reeds in which each two dents of either reed are not parallel to each other but intersect or cross.

Having thus described the invention, what is claimed is:

1. A circular loom comprising a two-piece annular reed consisting of two operatively integrated individual annular reeds, each reed being provided with an annular row of reed dents, one end of each dent being fixed in the body of its associated reed while the other end of the dent is free, each reed being provided with a supporting rim, to support the reed dents, the dent-supporting rims of the said individual reeds being concentrically disposed with respect to each other with the annular row of dents on the one reed extending toward the annular row of dents on the other reed, the radius of one annular row of dents being smaller than the radius of the other to an extent which provides a narrow annular gap between the rows of dents, a loom shuttle arranged to describe an annular path of movement, and a lance integrally mounted on said shuttle for annular travel therewith, the position and profile of the said lance being such that a portion thereof moves through the aforesaid narrow annular gap and that it overlaps the dents of the inner reed.

2. In a circular loom, a pair of upper and lower annular reed dents extending toward each other to form an inner and outer row of reed dents and spaced to define a narrow annular gap therebetween, a loom shuttle arranged to describe an annular path of movement, and a lance integrally mounted on said shuttle for annular travel therewith, the position and profile of the said lance being such that a portion thereof moves through the aforesaid narrow gap and that it overlaps the inner row of reed dents.

3. A lance tool comprising a supporting arcuate member, a downward extending arcuate flange, an outer lifting flange member bent inwardly at the top thereof, an inner lifting arcuate flange member arranged for positioning between the circular loom two-piece reeds, an angle member comprising a feeder and a main part attached to the inner lifting flange, said outer lifting flange member, inner lifting flange member and downward extending flange member being supported by said supporting member, said inner lifting flange member and outer lifting flange member adapted to be positioned between the circular loom two-piece reeds, and said feeder in said angle member provided with a groove adapted to thread the weft threads.

HERMANN SLOWAK.

REFERENCES CITED

The following references are of record in the file of this patent:

UNITED STATES PATENTS

| Number | Name | Date |
|---|---|---|
| 590,123 | Weiss | Sept. 14, 1897 |
| 944,421 | Evenden | Dec. 28, 1909 |
| 1,109,250 | Royle | Sept. 1, 1914 |
| 1,115,338 | Royle | Oct. 27, 1914 |
| 1,357,967 | Du Pray | Nov. 9, 1920 |
| 1,761,293 | Clark | June 3, 1930 |